United States Patent
Cho

(10) Patent No.: US 8,517,264 B2
(45) Date of Patent: Aug. 27, 2013

(54) SMART CARDS AND USER TERMINALS INCLUDING THE SAME

(75) Inventor: Zanghee Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 433 days.

(21) Appl. No.: 12/659,882

(22) Filed: Mar. 24, 2010

(65) Prior Publication Data

US 2010/0243734 A1    Sep. 30, 2010

(30) Foreign Application Priority Data

Mar. 27, 2009 (KR) ........................ 10-2009-0026254

(51) Int. Cl.
*G06K 5/00* (2006.01)
*G06K 19/00* (2006.01)
*G06K 19/06* (2006.01)
*G07D 11/00* (2006.01)
*G07F 19/00* (2006.01)
*H01L 23/02* (2006.01)

(52) U.S. Cl.
USPC ........... 235/382; 235/379; 235/380; 235/487; 235/492; 235/493; 257/679

(58) Field of Classification Search
USPC ......... 235/379–381, 487, 492, 493; 257/679, 257/690; 361/737
See application file for complete search history.

(56) References Cited

U.S. PATENT DOCUMENTS

| | | | | |
|---|---|---|---|---|
| 4,742,215 A * | 5/1988 | Daughters et al. | ............ | 235/487 |
| 4,982,069 A * | 1/1991 | Kayanakis | .................... | 235/375 |
| 5,838,059 A * | 11/1998 | Inoue et al. | .................... | 257/679 |
| 6,439,464 B1 * | 8/2002 | Fruhauf et al. | ................ | 235/492 |
| 6,573,567 B1 | 6/2003 | Nishizawa et al. | | |
| 6,581,122 B1 * | 6/2003 | Sarat | ............................. | 710/301 |
| 6,669,487 B1 * | 12/2003 | Ishihara et al. | .................. | 439/60 |
| 6,752,321 B1 * | 6/2004 | Leaming | ........................ | 235/492 |
| 6,896,523 B2 * | 5/2005 | Nishizawa et al. | ............. | 439/60 |
| 6,961,587 B1 * | 11/2005 | Vilppula et al. | ............... | 455/558 |
| 7,291,018 B2 * | 11/2007 | Nishizawa et al. | ............. | 439/60 |
| 7,402,047 B2 * | 7/2008 | Nishizawa et al. | ............. | 439/60 |
| 7,558,110 B2 * | 7/2009 | Mizushima et al. | ...... | 365/185.04 |
| 7,614,566 B2 * | 11/2009 | Shin et al. | ...................... | 235/492 |
| 7,815,125 B2 * | 10/2010 | Stranges et al. | .............. | 235/492 |
| 7,991,434 B2 * | 8/2011 | Yen et al. | ....................... | 455/558 |
| 2001/0009505 A1 * | 7/2001 | Nishizawa et al. | ........... | 361/737 |
| 2001/0011766 A1 * | 8/2001 | Nishizawa et al. | ........... | 257/685 |
| 2002/0023963 A1 * | 2/2002 | Luu | ................................ | 235/492 |
| 2002/0032859 A1 * | 3/2002 | Yoshizawa | ..................... | 713/159 |

(Continued)

FOREIGN PATENT DOCUMENTS

| | | |
|---|---|---|
| EP | 0 766 211 | 4/1997 |
| EP | 0 779 598 | 6/1997 |

(Continued)

*Primary Examiner* — Daniel Walsh

(74) *Attorney, Agent, or Firm* — Harness, Dickey & Pierce

(57) ABSTRACT

A smart card includes: a host integrated circuit (IC) and one or more secure authentication ICs disposed on a board. The host IC contacts a user's terminal. The host IC is configured to receive signals and execute services in accordance with the received signals. The one or more secure authentication ICs are also configured to receive signals from the host IC and accommodate an application independent of or relevant to the host IC to execute a function of the application. Accordingly, independence and security of the secure authentication ICs is improved.

7 Claims, 8 Drawing Sheets

(56) References Cited

U.S. PATENT DOCUMENTS

| | | | |
|---|---|---|---|
| 2002/0099846 A1* | 7/2002 | Hicks | 709/236 |
| 2003/0085287 A1* | 5/2003 | Gray | 235/492 |
| 2003/0112611 A1* | 6/2003 | Nishizawa et al. | 361/763 |
| 2003/0112613 A1* | 6/2003 | Nishizawa et al. | 361/764 |
| 2003/0230631 A1* | 12/2003 | Tsunoda et al. | 235/492 |
| 2004/0084538 A1* | 5/2004 | Nishizawa et al. | 235/492 |
| 2004/0089717 A1* | 5/2004 | Harari et al. | 235/441 |
| 2004/0177215 A1* | 9/2004 | Nagamasa et al. | 711/103 |
| 2004/0178276 A1* | 9/2004 | Fruhauf et al. | 235/492 |
| 2004/0210715 A1* | 10/2004 | Harari et al. | 711/115 |
| 2004/0232247 A1* | 11/2004 | Tsunoda et al. | 235/492 |
| 2004/0256459 A1* | 12/2004 | Wallace et al. | 235/441 |
| 2005/0037671 A1* | 2/2005 | Yamada et al. | 439/677 |
| 2005/0094463 A1* | 5/2005 | Nishizawa et al. | 365/222 |
| 2005/0116050 A1* | 6/2005 | Jei et al. | 235/492 |
| 2005/0185463 A1* | 8/2005 | Kanamori et al. | 365/185.04 |
| 2005/0189426 A1* | 9/2005 | Nishizawa et al. | 235/492 |
| 2005/0190624 A1* | 9/2005 | Kasai | 365/222 |
| 2005/0224588 A1* | 10/2005 | Ruping et al. | 235/492 |
| 2006/0049258 A1* | 3/2006 | Piikivi | 235/451 |
| 2006/0131430 A1* | 6/2006 | Ito | 235/492 |
| 2006/0151614 A1* | 7/2006 | Nishizawa et al. | 235/492 |
| 2006/0175417 A1* | 8/2006 | Ho | 235/492 |
| 2006/0186211 A1* | 8/2006 | Kim et al. | 235/492 |
| 2006/0202034 A1* | 9/2006 | Wallace et al. | 235/441 |
| 2006/0208091 A1* | 9/2006 | Nishizawa et al. | 235/492 |
| 2006/0228909 A1* | 10/2006 | Nishizawa et al. | 439/55 |
| 2007/0095923 A1* | 5/2007 | Dietze | 235/492 |
| 2007/0110404 A1* | 5/2007 | Ching et al. | 386/112 |
| 2007/0194134 A1* | 8/2007 | Shin et al. | 235/492 |
| 2007/0228154 A1* | 10/2007 | Tran | 235/380 |
| 2007/0253251 A1* | 11/2007 | Mizushima et al. | 365/185.04 |
| 2008/0067255 A1* | 3/2008 | Harari et al. | 235/492 |
| 2008/0073436 A1* | 3/2008 | Nishizawa et al. | 235/492 |
| 2008/0149734 A1* | 6/2008 | Musial et al. | 235/492 |
| 2008/0231451 A1* | 9/2008 | Kamel | 340/572.1 |
| 2008/0261656 A1* | 10/2008 | Bella et al. | 455/558 |
| 2009/0134212 A1* | 5/2009 | Chamley et al. | 235/375 |
| 2009/0181721 A1* | 7/2009 | Nishizawa et al. | 455/558 |
| 2009/0314841 A1* | 12/2009 | Tomoeda | 235/492 |
| 2011/0065386 A1* | 3/2011 | Keller | 455/41.1 |
| 2011/0066777 A1* | 3/2011 | Della Pia et al. | 710/106 |
| 2011/0227234 A1* | 9/2011 | Nishizawa et al. | 257/784 |

FOREIGN PATENT DOCUMENTS

| | | |
|---|---|---|
| JP | 09-167217 | 6/1997 |
| JP | 2006-164302 | 6/2006 |
| KR | 10-0219788 | 6/1999 |
| KR | 1020010060270 | 7/2001 |
| KR | 1020050069625 | 7/2005 |
| WO | WO 00/05682 | 2/2000 |

* cited by examiner

SMART CARDS AND USER TERMINALS INCLUDING THE SAME

CROSS-REFERENCE TO RELATED APPLICATIONS

This U.S. non-provisional patent application claims priority under 35 U.S.C. §119 to Korean Patent Application 10-2009-0026254, filed on Mar. 27, 2009, the entire contents of which are hereby incorporated by reference.

BACKGROUND OF INVENTIVE CONCEPTS

1. Field

Example embodiments relate to smart cards, for example, smart cards capable of ensuring independence of each application, and user terminals including the same.

2. Description of the Conventional Art

Smart cards accommodate an integrated circuit chip including a microprocessor, a card operating system, a secure module, and a memory to process specific works. Smart cards typically have an arithmetic ability, an encryption function, and a bi-directional communication function. Moreover, smart cards are relatively secure and convenient for users to carry. A variety of smart cards are employed in daily life, such as transportation, clinic and health care, identity confirmation, distribution, and civil affairs.

Smart cards are classified as contact type cards or non-contact type cards in accordance with the manner in which the card interfaces. There are also combination cards and hybrid cards, which combine contact type cards and non-contact type cards. A contact type card is capable of transmitting a larger amount of data than a non-contact type card. Generally, contact type cards conform to the ISO/IEC 7816 standard. Non-contact type cards operate away from a card reader by a certain distance without insertion into the card reader. Generally, non-contact type cards conform to the ISO/IEC 10536 standard, the ISO/IEC 14443 standard, and the like.

An example contact type card is a SIM (Subscriber Identification Module) card embedded in a GSM (Global System for Mobile communication) type cellular phone. A SIM card is a kind of subscriber identity module that stores user information and is capable of identifying users on the basis of user names and passwords. Even though SIM cards are inserted into cellular phones of another user, the cost is charged to the user's unique telephone number.

In recent years, various kinds of application software have been added to SIM cards to support a variety of services. For example, applications supporting a monetary payment service, applications supporting a pay digital broadcasting service, and other applications have been embedded in SIM cards. However, when a variety of applications are embedded in a SIM card as software, security problems may arise and the independence of each application may not be ensured.

SUMMARY OF INVENTIVE CONCEPTS

Example embodiments provide smart cards capable of ensuring security and independence of a security authentication integrated circuit (IC) and user terminals including the same.

At least one example embodiment of inventive concepts provides a smart card including: a host IC and one or more secure authentication ICs. The host IC is disposed on a board and configured to receive signals by contacting a user's terminal. The host IC is also configured to execute services in accordance with the received signals. The secure authentication ICs are disposed on the board and configured to receive signals from the host IC. The secure authentication ICs accommodate an application independent of, or relevant to, the host IC to execute a function of the application.

At least one other example embodiment provides a user terminal including: a smart card and an interface device. The smart card includes: a board; a host IC; and one or more secure authentication ICs. The host IC is disposed on the board and configured to receive signals by contacting a user's terminal. The host IC is also configured to execute services in accordance with the received signals. The secure authentication ICs are disposed on the board and configured to receive signals from the host IC. The secure authentication ICs accommodate an application independent of, or relevant to, the host IC to execute a function of the application. The interface device is configured to accommodate the smart card. The smart card is activated when contacting the interface device and the smart card receives driving signals from the user terminal via the interface device.

According to at least some example embodiments, the host IC may be a subscriber identity module (SIM) IC. The one or more secure authentication ICs may be formed of at least one of a Europay Mastercard Visacard (EMV) IC for monetary transaction and a conditional access system (CAS) IC for pay broadcast.

The host IC may include: a plurality of main contact pads configured to receive signals from the user terminal; and one or more sub-contact pads contacting the one or more secure authentication ICs. The plurality of main contact pads include: a first main contact pad configured to receive a power voltage; a second main contact pad configured to receive a reset signal; a third main contact pad configured to receive a clock signal; a fourth main contact pad configured to provide a ground for the host IC; and a fifth main contact pad configured to be an interface.

According to at least some example embodiments, each of the one or more secure authentication ICs may include: a plurality of contact pads contacting the host IC. First to fourth ones of the plurality of contact pads may be connected to the first to fourth sub-contact pads, respectively, and a fifth of the plurality of contact pads is grounded.

A plurality of sub-contact pads may be configured to interface with the one or more secure authentication ICs. First to third ones of the plurality of contact pads may be connected to the first to third main contact pads, respectively, a fourth of the plurality of contact pads is connected to a sub-contact pad among the plurality of sub-contact pads, and a fifth of the plurality of contact pads is grounded.

According to at least some example embodiments, the smart card may include: a plurality of secure authentication ICs. A plurality of fourth sub-contact pads may be configured to interface with the plurality of secure authentication ICs. In accordance with at least one other example embodiment, a plurality of second sub-contact pads may be configured to output a host reset signal, and a fourth sub-contact pad may be configured to interface with the plurality of secure authentication ICs.

According to at least some example embodiments, the plurality of main contact pads may further include: preliminary seventh and eighth main contact pads. The seventh and eighth main contact pads may be connected to an antenna configured to transmit/receive wireless frequency signals. The one or more secure authentication ICs may further include: one or more sixth contact pads configured to transmit/receive the wireless frequency signals.

According to at least some example embodiments, the host IC may further include: an SIO interface configured to transmit signals received via the smart card; a processor unit configured to process the signals transmitted by the SIO interface; and a memory configured to store the signals transmitted by the smart card. The host IC may further include: a plurality of main contact pads configured to receive signals from the user terminal; and a plurality of sub-contact pads. The processor unit may be configured to process the signals received through the plurality of main contact pads to generate a plurality of output signals, and configured to apply the plurality of generated output signals to the plurality of sub-contact pads.

At least two of the plurality of main contact pads may be connected to an antenna configured to transmit/receive wireless frequency signals. The one or more secure authentication ICs may include: a plurality of contact pads configured to receive the plurality of generated output signals from the sub-contact pads of the host IC.

BRIEF DESCRIPTION OF THE DRAWINGS

The accompanying drawings are included to provide a further understanding of inventive concepts. The accompanying drawings are incorporated in and constitute part of this specification. The drawings illustrate example embodiments of inventive concepts. Together with the description, the drawings serve to explain principles of inventive concepts. In the drawings.

DETAILED DESCRIPTION

Figure 1A:
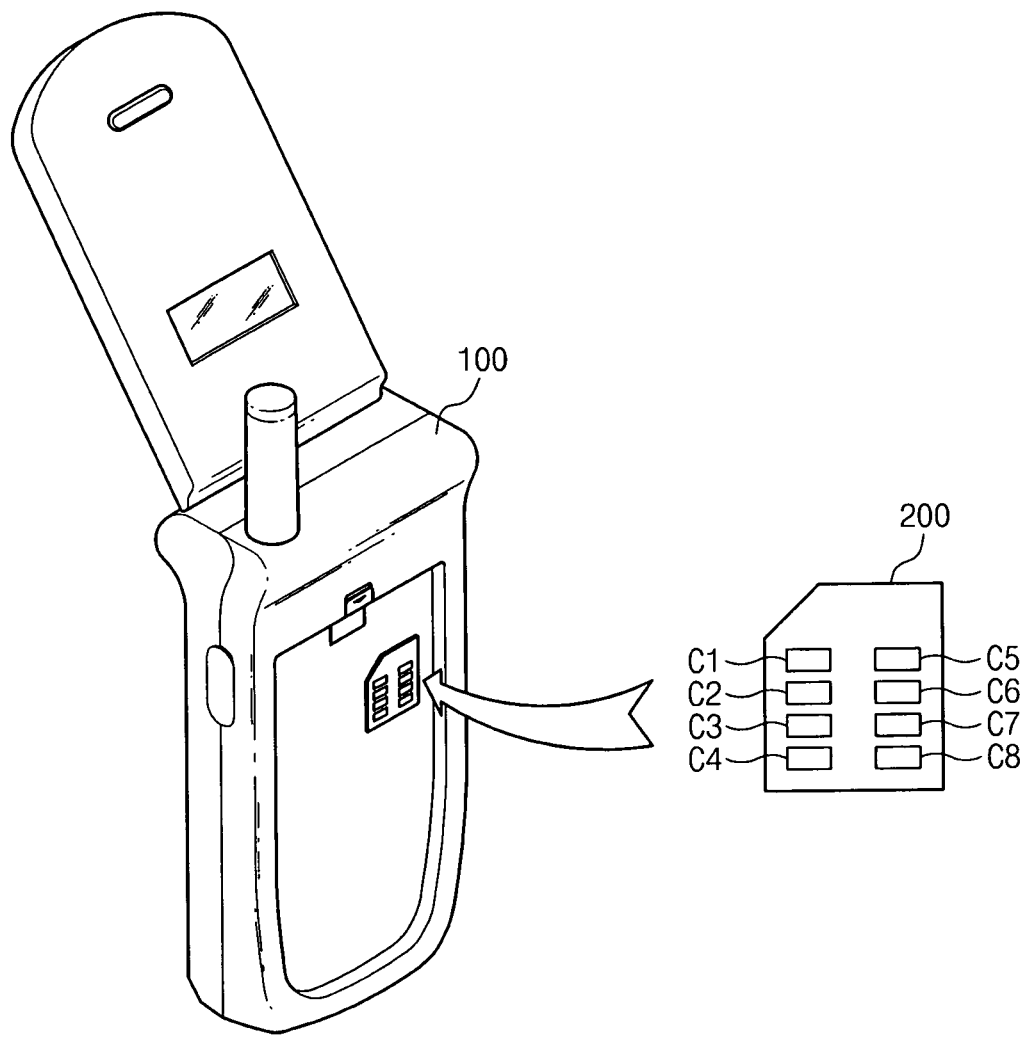
FIG. 1A is a diagram illustrating an example embodiment of a smart card and a user's terminal in which the smart card may be embedded.

Inventive concepts will now be described more fully with reference to the accompanying drawings, in which example embodiments are shown. In the drawings, the thicknesses of layers and regions are exaggerated for clarity. Like reference numerals in the drawings denote like elements.

Detailed illustrative embodiments are disclosed herein. However, specific structural and functional details disclosed herein are merely representative for purposes of describing example embodiments. Inventive concepts may, however, may be embodied in many alternate forms and should not be construed as limited to only the example embodiments set forth herein.

It should be understood, however, that there is no intent to limit inventive concepts to the particular example embodiments disclosed, but on the contrary example embodiments are to cover all modifications, equivalents, and alternatives falling within the scope of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1B:
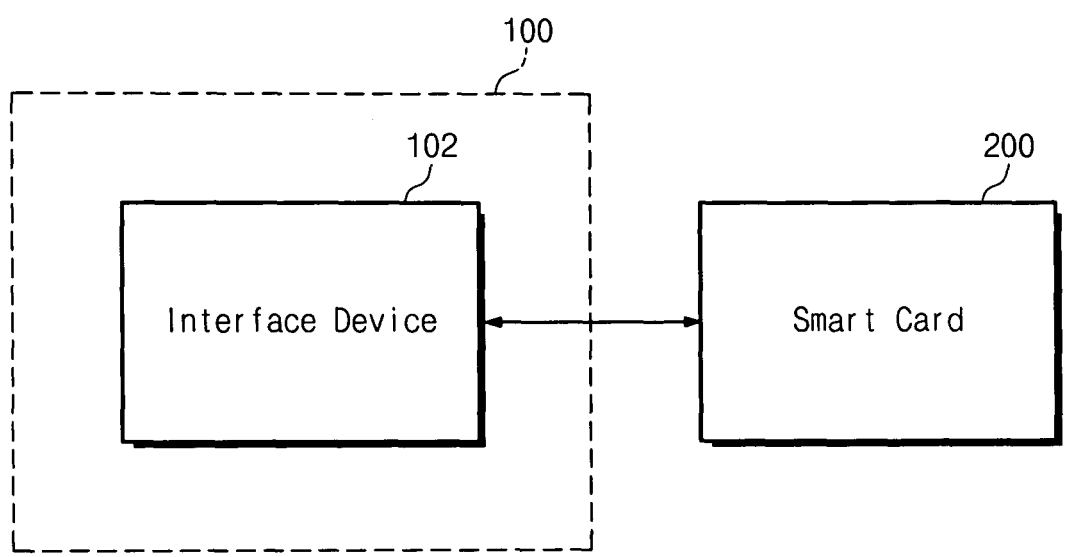
FIG. 1B is a block diagram illustrating the example embodiment shown in FIG. 1 in more detail.

FIG. 1A is a diagram illustrating an example embodiment of a smart card and a user's terminal in which the smart card may be embedded. FIG. 1B is a block diagram illustrating the example embodiment shown in FIG. 1A in more detail. As described herein, the user's terminal is sometimes referred to as a user terminal.

In the example embodiment shown in FIGS. 1A and 1B, a cellular phone is described as an example of the user's terminal 100 coupled with a smart card 200. However, this is merely an example. Users' terminals such as PDAs (Personal Digital Assistants), a PMP (Personal Multimedia Player), a digital camera, a PVR (Personal Video Recorder), etc. may be used as well as the cellular phone.

Referring to FIGS. 1A and 1B, a cellular phone 100 includes an interface device (IFD) 102 configured to accommodate the smart card 200. When contact pads C1 to C8 of the smart card 200 contact (e.g., directly contact) the IFD 102, the smart card is activated. In so doing, the smart card 200 receives signals, such as a power voltage, a reset signal, and a clock signal, which are necessary for driving the smart card, from the cellular phone 100 through the contact pads C1 to C8 to exchange information.

Figure 2:
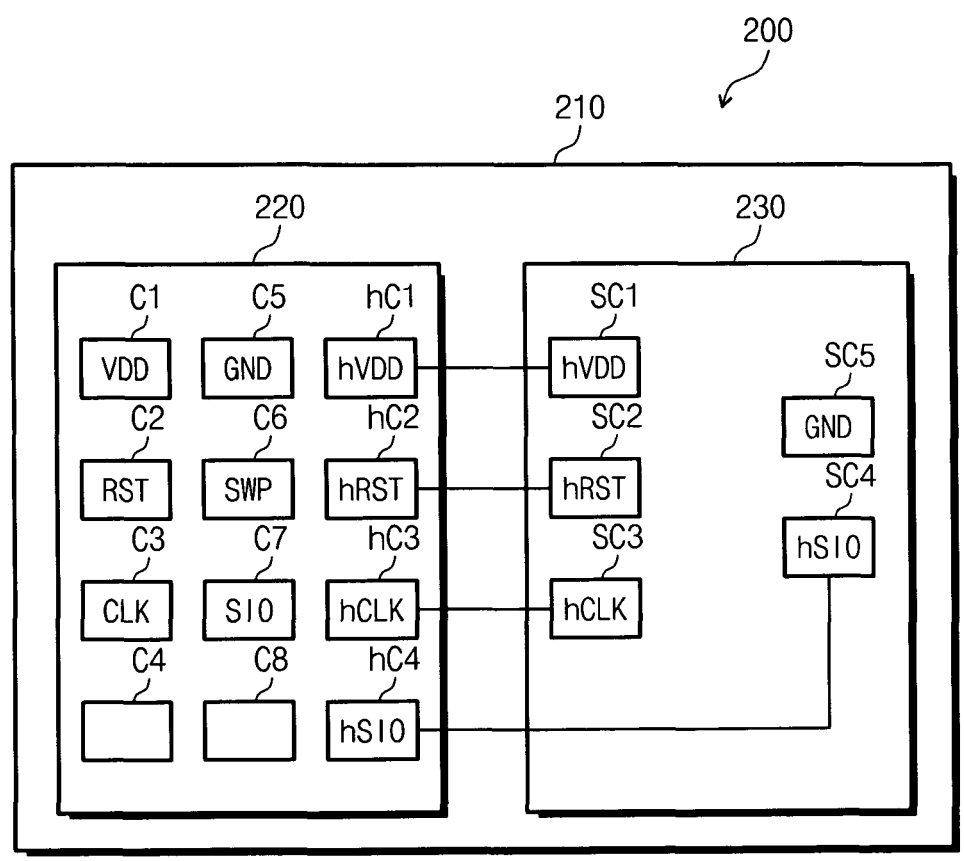
FIG. 2 is a block diagram illustrating a smart card according to an example embodiment of an inventive concept.
Figure 3:
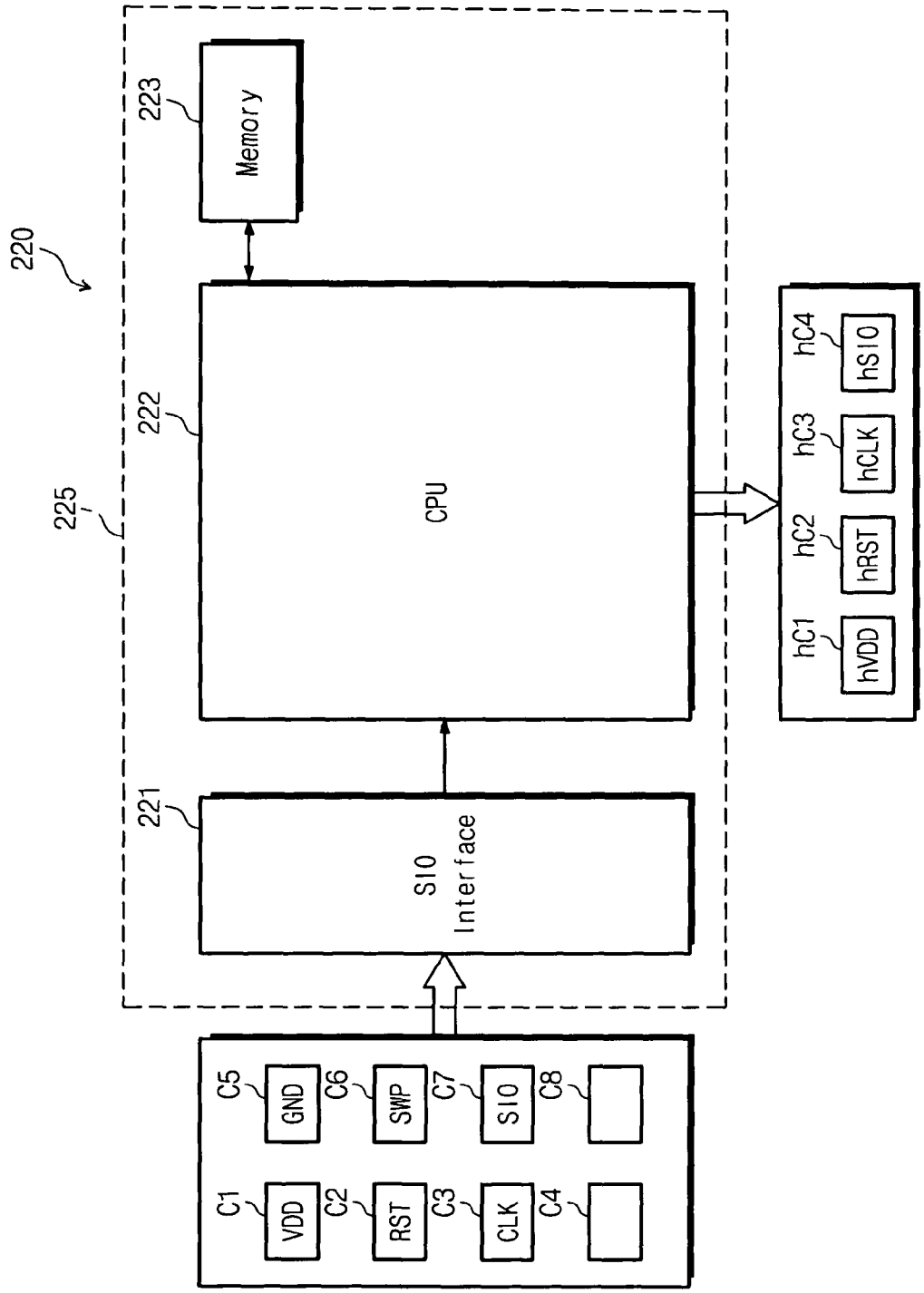
FIG. 3 is a block diagram illustrating an example embodiment of the SIM IC (Subscriber Identity Module Integrated Circuit) illustrated in FIG. 2.

FIG. 2 is a block diagram illustrating a smart card according to an example embodiment of an inventive concept. FIG. 3 is a block diagram illustrating an example embodiment of the SIM IC (Subscriber Identity Module Integrated Circuit) illustrated in FIG. 2.

Referring to FIG. 2, the smart card 200 includes: a board 210, a SIM IC 220, and a secure authentication IC 230. The SIM IC 220 and the secure authentication IC 230 are disposed on the board 210. In some cases, the SIM IC 220 is also referred to herein as the host IC 220.

The SIM IC 220 is a type of subscriber identity module identifying users based on user names and passwords. The SIM IC 220 functions as a storage medium configured to store user information and accommodate an application to execute functions of the application. In this example embodiment, the term "SIM" is used, but at least this embodiment is also applicable to, for example, USIM (Universal Subscriber Identity Module) or UIM (User Identity Module).

The SIM IC 220 includes first to eighth main contact pads C1, C2, C3, C4, C5, C6, C7, and C8 configured to contact the IFD 102 and cellular phone 100 illustrated in FIGS. 1A and 1B. The SIM IC 220 further includes first to fourth sub-contact pads hC1, hC2, hC3, and hC4 configured to contact the secure authentication IC 230. In at least this example embodiment, the first to eight main contact pads C1 to C8 may be defined by the ISO 7816, which is a standard for contact type smart cards.

More specifically, the first main contact pad C1 is supplied with a power voltage VDD for the SIM IC 220 from an external interface device. The second main contact pad C2 is configured to receive a reset signal RST to reset an internal circuit of the SIM IC 220. The third main contact pad C3 is configured to receive a clock CLK from an external interface device. The clock CLK drives a microprocessor of the SIM IC 220. The fifth main contact pad C5 is configured to provide electric ground GND for the SIM IC 220. The sixth main contact pad C6 is configured to receive a swap signal SWP. The seventh main contact pad C7 is configured to input and output data by carrying out communication in a series data input/output (SIO) manner.

The fourth and eighth main contact pads C4 and C8 are preliminary contact pads for the future, which are not defined in the ISO 7816 standard. In recent years, the fourth and eight main contact pads C4 and C8 have been used as a data input contact pad and a data output contact pad for a USB (Universal Serial Bus), respectively.

In at least this example embodiment, the contact type SIM IC 220 is used, but it is apparent to those skilled in the art that the SIM IC 220 may be a non-contact, a combination or hybrid type SIM IC.

Referring to FIG. 3, the internal circuit of the SIM IC 220 includes: an SIO interface 221; a microprocessor 222 (hereinafter, referred to as a CPU); and a memory 223. The SIO interface 221 is disposed between the first to eighth main contact pads C1 to C8 and the CPU 222 to transmit signals VDD, RST, CLK, and SIO received through the first to eighth main contact pads C1 to C8 to the CPU 222.

The CPU 222 executes a variety of application operations. The memory 223 may include an EEPROM, a ROM, and a RAM. In one example, the RAM is used as a buffer for storing the transmitted data, the ROM stores an operating system and a set of commands to be executed by the CPU 222, and the EEPROM is used for applications downloaded to the operating system.

The CPU 222 processes the signals VDD, RST, CLK, and SIO received through the first to eighth main contact pads C1 to C8 to generate a host power voltage hVDD, a host reset signal hRST, a host clock signal hCLK, and a host input/output data hSIO, respectively. The generated host power voltage hVDD is applied to the first sub-contact pad hC1. The generated host reset signal hRST is applied to the second sub-contact pad hC2. The generated host clock signal hCLK is applied to the third sub-contact pad hC3, and the generated host input/output data hSIO is applied to the fourth sub-contact pad hC4.

Referring back to FIG. 2, the secure authentication IC 230 includes first to fifth contact pads SC1, SC2, SC3, SC4, and SC5. The first contact pad SC1 receives the host power voltage hVDD from the first sub-contact pad hC1. The second contact pad SC2 receives the host reset signal hRST from the second sub-contact pad hC2. The third contact pad SC3 receives the host clock signal hCLK from the third sub-contact pad hC3. The fourth contact pad SC4 transmits and receives the SIO input/output data, and the fifth contact pad SC5 provides the electric ground GND for the secure authentication IC 230. In this way, the contact pads SC1 to SC5 of the secure authentication IC 230 receive the signals from the user's terminal through the SIM IC 220, but do not directly contact the user's terminal. In this example, the secure authentication IC 230 is controlled by the SIM IC 220.

According to at least this example embodiment of inventive concepts, the secure authentication IC 230 conforms to the ISO 7816 standard, and the SIO interface methods are also used between the secure authentication IC 230 and the SIM IC 220.

The secure authentication IC 230 may be formed of one of an Europay Mastercard Visacard (EMV) IC for monetary transaction and a conditional access system (CAS) IC for digital broadcast. More specifically, the EMV IC stores data necessary for monetary transaction service and accommodates an application to carry out the monetary transaction service in accordance with the accommodated application. The CAS IC stores a payment application for digital broadcast to execute a service in accordance with the payment application.

Because the secure authentication IC 230, such as the EMC IC and the CAS IC, has an application independent of, or relevant to, the SIM IC 220, the secure authentication IC 230 and the SIM IC 220 may simultaneously or concurrently execute functions. That is, for example, an internet payment may be carried out while a user is on the phone at the same time (simultaneously or concurrently) as a transportation card function is performed. Accordingly, independence of the application between the secure authentication IC 230 and the SIM IC 220 may be ensured.

Moreover, by separating the secure authentication IC 230 from the SIM IC 220 in the smart card 200, the security of the secure authentication IC 230 may be ensured even in hacking of the SIM IC 220.

Figure 4:
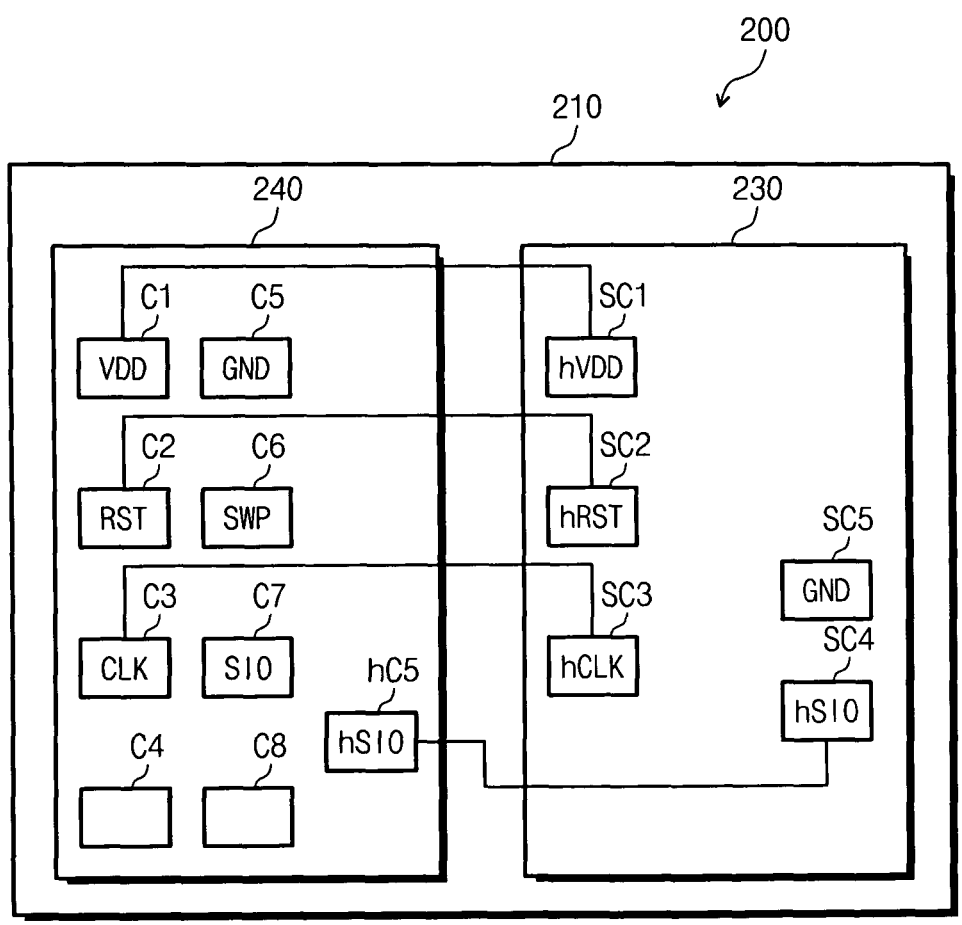
FIG. 4 is a block diagram illustrating a smart card according to another example embodiment of an inventive concept.

FIG. 4 is a block diagram illustrating a smart card according to another example embodiment of an inventive concept.

Referring to FIG. 4, the smart card 200 includes: a board 210; a SIM IC 240; and a secure authentication IC 230. The SIM IC 240 includes first to eighth main contact pads C1 to C8 configured to contact a user's terminal. The SIM IC 240 further includes a sub-contact pad hC5 configured to contact the secure authentication IC 220.

The secure authentication IC 230 includes first to fifth contact pads SC1 to SC5 configured to contact the SIM IC 240. The first contact pad SC1 is connected to the first main contact pad C1 of the SIM IC 240 and configured to receive a power voltage VDD. The second contact pad SC2 is connected to the second main contact pad C2 of the SIM IC 240 and configured to receive a reset signal RST. The third contact pad SC3 is connected to the third main contact pad C3 of the SIM IC 240 and configured to receive a clock signal CLK. The fourth contact pad SC4 is connected to the sub-contact pad hC5 of the SIM IC 240 and configured to receive host input/output data hSIO. The fifth contact pad SC5 is configured to provide the electric ground GND for the secure authentication IC 230.

As illustrated in FIG. 4, the power voltage VDD, the reset signal RST, and the clock signal CLK supplied from the user's terminal to the SIM IC 240 may be provided to the first to third contact pads SC1 to SC3 of the secure authentication IC 230, respectively, without change. In this case, however, the host input/output data hSIO is provided to the secure authentication IC 230 through the SIM IC 240 without directly contacting the user's terminal. Accordingly, when the first to third main contact pads C1 to C3 of the SIM IC 240 are directly connected to the first to third contact pads SC1 to SC3 of the secure authentication IC 230, the total number of contact pads in the SIM IC 240 may be reduced.

Figure 5:
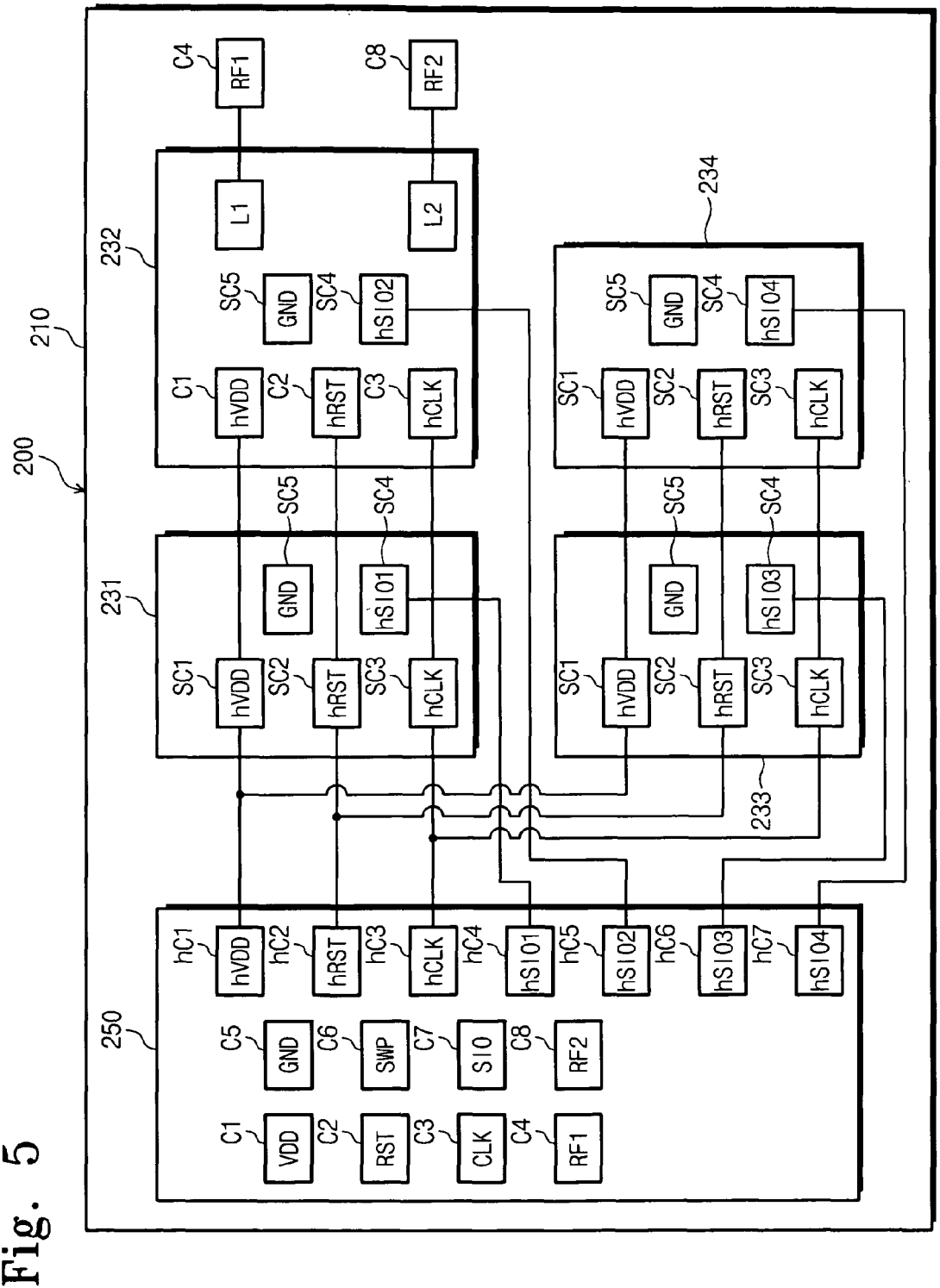
FIG. 5 is a block diagram illustrating a smart card according to yet another example embodiment of an inventive concept.
Figure 6:
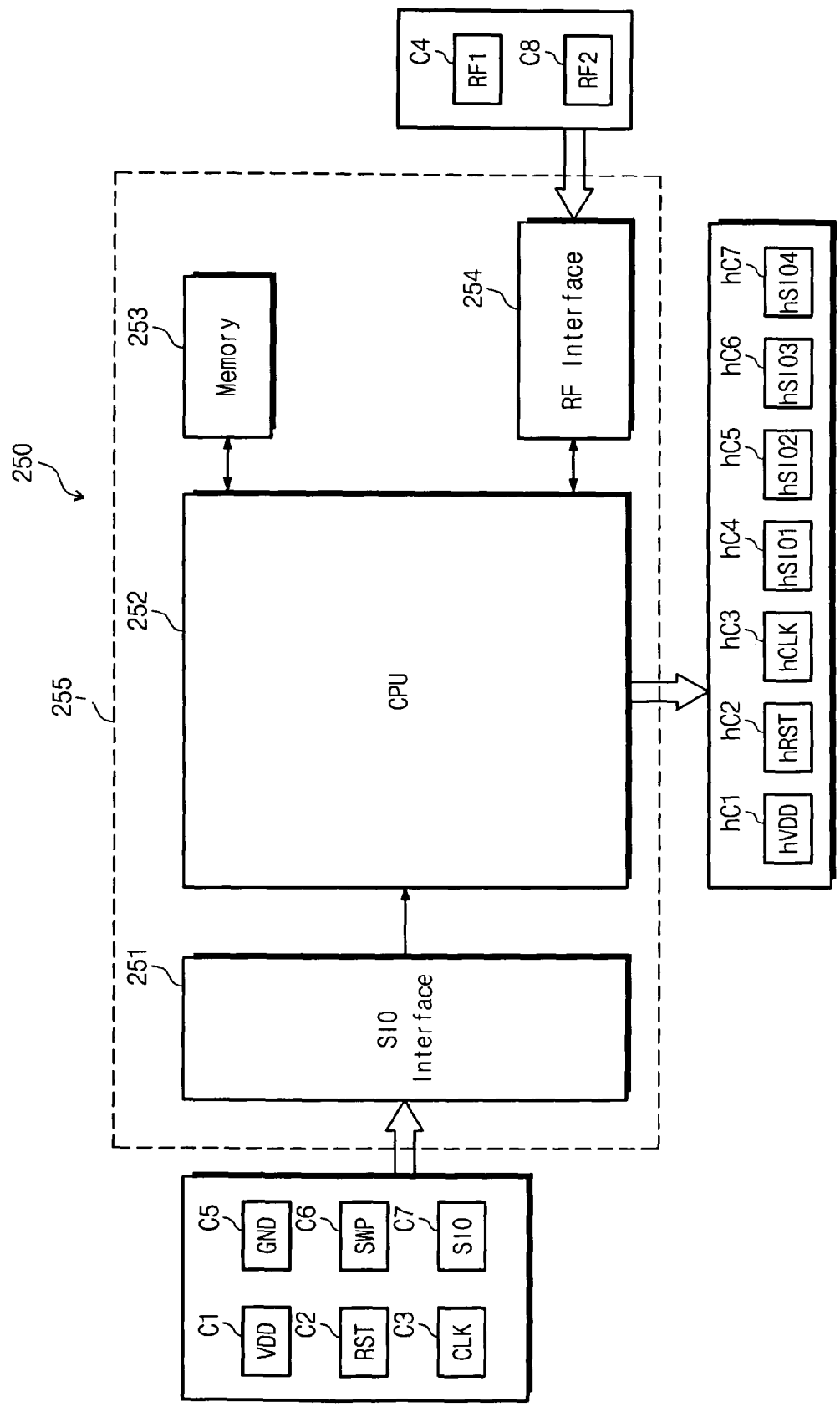
FIG. 6 is a block diagram illustrating an example embodiment of the SIM IC illustrated in FIG. 5.

FIG. 5 is a block diagram illustrating a smart card according to a further example embodiment of an inventive concept. FIG. 6 is a block diagram illustrating an example embodiment of the SIM IC illustrated in FIG. 5.

Referring to FIG. 5, a smart card 200 includes: a board 210; a SIM IC 250; and first to fourth secure authentication ICs 231, 232, 233, and 234. The SIM IC 250 and the first to fourth secure authentication ICs 231 to 234 are disposed on the board 210. This example embodiment describes a configuration having four secure authentication ICs 231 to 234, but the number of secure authentication ICs 221 to 224 is not limited thereto. The number of secure authentication ICs may be varied.

The SIM IC 250 includes first to seventh sub-contact pads hC1 to hC7 in addition to the first to eighth main contact pads C1 to C8. The first, second, third, fifth, sixth, and seventh main contact pads C1, C2, C3, C5, C6, and C7 may directly contact the user's terminal to receive signals. In at least this example embodiment, the fourth and eighth main contact pads C4 and C8 are connected to an antenna (not illustrated), which may be disposed along the circumference of the smart card 200 to receive wireless frequency signals RF1 and RF2.

Referring to FIG. 6, an internal circuit 255 of the SIM IC 250 includes: an SIO interface 251; a CPU 252; a memory 253; and an RF interface 254. The RF interface 254 is configured to receive the wireless frequency signals RF1 and RF2 through the fourth and eighth main contact pads C4 and C8. Here, it is apparent that the RF interface 254 uses a communication protocol of a non-contact type IC card, which is referred to as the international standard ISO/IEC 14443.

The CPU 252 is configured to process signals VDD, RST, CLK, and SIO received via the first, second, third and seventh main contact pads C1, C2, C3 and C7 to generate a host power voltage hVDD, a host reset signal hRST, a host clock signal hCLK, and first to fourth host input/output data hSIO1, hSIO2, hSIO3, and hSIO4. The generated host power voltage hVDD may be applied to the first sub-contact pad hC1. The generated host reset signal hRST may be applied to the second sub-contact pad hC2. The generated host clock signal hCLK may be applied to the third sub-contact pad hC3. The first to fourth host input/output data hSIO1 to hSIO4 may be applied to the fourth to seventh sub-contact pads hC4 to hC7, respectively.

Referring back to FIG. 5, each of the first to fourth secure authentication ICs 231, 232, 233, and 234 have first to fifth contact pads SC1, SC2, SC3, SC4, and SC5. The first contact pad SC1 is configured to receive the host power voltage hVDD from the first sub-contact pad hC1. The second contact pad SC2 is configured to receive the host reset signal hRST from the second sub-contact pad hC2. The third contact pad SC3 is configured to receive the host clock signal hCLK from the third sub-contact pad hC3. The fifth contact pad SC5 is configured to provide the electric ground GND for the secure authentication IC 230.

The fourth contact pads SC4 of the first to fourth secure authentication ICs 231 to 234 are connected to the first to fourth sub-contact pads hSIO1 to hSIO4, respectively, and configured to receive corresponding SIO input/output data.

The first to fourth secure authentication ICs 231 to 234 may be formed of one of the Europay Mastercard Visacard (EMV) IC for monetary transaction and the conditional access system (CAS) IC for digital broadcast, respectively. Because the first to fourth secure authentication ICs 231 to 234 have the application independent of, or relevant to, the SIM IC 250, the first to fourth secure authentication ICs 231 to 234 and the SIM IC 250 may execute functions simultaneously or concurrently. That is, for example, the payment for pay contents or a transportation card function may simultaneously or concurrently be carried out while a user watches a program with a cellular phone.

The first to fourth secure authentication ICs 231 to 234 may be formed of a contact type, a non-contact type, a combination type thereof, or a hybrid type thereof. In at least this example embodiment, the first, third, and fourth secure authentication ICs 231, 233, and 234 are formed of the contact type and the second secure authentication IC 232 is formed of the combination type.

The combination type of second secure authentication IC 232 may further include sixth and seventh contact pads L1 and L2 in addition to the first to fifth contact pads SC1 to SC5. In this case, the sixth and seventh contact pads L1 and L2 are connected to the fourth and eighth main contact pads C4 and C8 of the SIM IC 250 and configured to receive the wireless frequency signals RF1 and RF2 through the SIM IC 250, respectively, but not configured to carry out communication directly with the outside.

As illustrated in FIG. 5, the SIO contact pads hC4 of the first to fourth secure authentication ICs 231 to 234 are connected to the SIM IC 250 through SIO lines, respectively. However, the SIO contact pads hC4 of the first to fourth secure authentication ICs 231 to 234 may be connected to the SIM IC 250 through one common SIO line.

Figure 7:
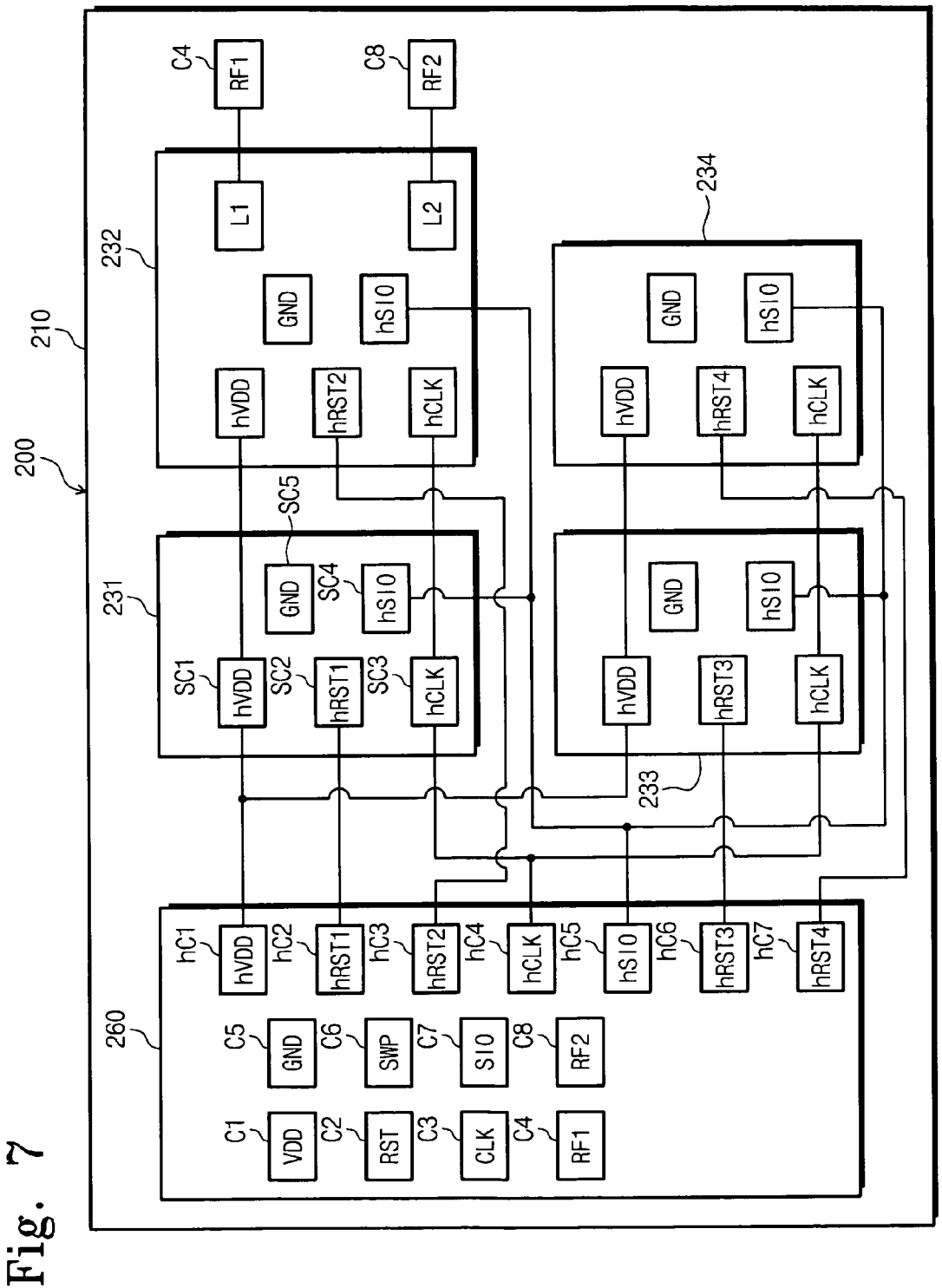
FIG. 7 is a block diagram illustrating a smart card according to yet another example embodiment of an inventive concept.

FIG. 7 is a block diagram illustrating a smart card according to another example embodiment of an inventive concept.

Referring to FIG. 7, a smart card 200 includes: a board 210; an SIM IC 260; and first to fourth secure authentication ICs 231, 232, 233, and 234. The SIM IC 260 includes first to seventh sub-contact pads hC1 to hC7 as well as the first to eighth main contact pads C1 to C8.

Among the sub-contact pads, the first, fourth, and fifth sub-contact pads hC1, hC4, and hC5 are connected to first, third, and fourth contact pads SC1, SC3, and SC4 of each of the first to fourth secure authentication ICs 231 to 234. The second, third, sixth, and seventh sub-contact pads hC2, hC3, hC6, and hC7 are connected to the second contact pads SC2 of the first to fourth secure authentication ICs 231 to 234, respectively. The SIM IC 260 is configured to separately control the first to fourth secure authentication ICs 231 to 234 to output first to fourth host reset signals hRST1, hRST2, hRST3, and hRST4 to the second, third, sixth, and seventh sub-contact pads hC2, hC3, hC6, and hC7, respectively, thereby selectively activating only the secure authentication ICs receiving the activated host reset signal.

With such a configuration, only one SIO line may be needed between the SIM IC 260 and the first to fourth secure authentication ICs 231 to 234, but four reset lines may be needed to transmit the first to fourth host reset signals hRST1 to hRST4.

The first to third contact pads SC1 to SC3 of each of the first to fourth secure authentication ICs 231 to 234 may be directly connected to the first to third main contact pads C1 to C3 of the SIM IC 260 to receive the power voltage VDD, the reset signal RST, and the clock signal CLK, even though not illustrated in FIG. 7.

According to at least this example embodiment, the smart card accommodates an independent and relevant application, and adds the secure authentication IC controlled by the host IC without accommodating a necessary application in a host IC as software, when a function is added to a smart card. Accordingly, independence and security of the secure authentication IC may be ensured.

Example embodiments of inventive concepts have been described. However, it is apparent to those skilled in the art that inventive concepts may be changed or modified in various forms within the scope of inventive concepts without departing from the spirit and scope of the appended claims.

What is claimed is:

1. A smart card comprising:
a host integrated circuit (IC) disposed on a board, the host IC being configured to receive a signal by contacting a user terminal, and the host IC being further configured to execute a service in accordance with the received signal; and
one or more secure authentication ICs disposed on the board, the one or more secure authentication ICs being configured to receive a signal from the user terminal only through the host IC, accommodate an application independent of the host IC, and configured to execute a function of the application, wherein,
the host IC includes a plurality of main contact pads configured to receive signals from the user terminal and one or more sub-contact pads contacting the one or more secure authentication ICs, the plurality of main contact pads including:
a first main contact pad configured to receive a power voltage;
a second main contact pad configured to receive a reset signal;
a third main contact pad configured to receive a clock signal,
a fourth main contact pad configured to provide a ground for the host IC, and a fifth main contact pad configured to be an interface, and the one or more sub-contact pads including:
a first sub-contact pad configured to output a host power voltage;
a second sub-contact pad configured to output a host reset signal;
a third sub-contact pad configured to output a host clock signal; and
a fourth sub-contact pad configured to interface with the secure authentication IC;
each of the one or more secure authentication ICs includes a plurality of contact pads contacting the host IC; and wherein
first to fourth ones of the plurality of contact pads are connected to the first to fourth sub-contact pads, respectively, and
a fifth of the plurality of contact pads is grounded.

2. The smart card of claim 1, wherein,
the one or more secure ICs are a plurality of secure authentication ICs the plurality of secure authentication ICs being configured to receive a signal from the host IC, the one or more sub-contact pads are a plurality of sub-contact pads contacting the plurality of secure authentication ICs, and
the fourth sub-contact pad includes a plurality of fourth sub-contact pads configured to interface with the plurality of secure authentication ICs.

3. The smart card of claim 1, wherein the plurality of main contact pads further include:
preliminary seventh and eighth main contact pads.

4. The smart card of claim 3, wherein the seventh and eighth main contact pads are connected to an antenna configured to transmit/receive wireless frequency signals.

5. The smart card of claim 4, wherein the secure authentication ICs further comprise:
one or more sixth contact pads configured to transmit/receive the wireless frequency signals.

6. A smart card comprising:
a host integrated circuit (IC) disposed on a board, the host IC being configured to receive a signal by contacting a user terminal, and the host IC being further configured to execute a service in accordance with the received signal; and
a plurality of secure authentication ICs disposed on the board, the plurality of secure authentication ICs being configured to receive a signal from the host IC, accommodate an application independent of the host IC, and configured to execute a function of the application, wherein
the host IC includes,
a plurality of main contact pads configured to receive signals from the user terminal, the plurality of main contact pads including,
a first main contact pad configured to receive a power voltage,
a second main contact pad configured to receive a reset signal,
a third main contact pad configured to receive a clock signal,
a fourth main contact pad configured to provide a ground for the host IC, and
a fifth main contact pad configured to be an interface; and
a plurality of sub-contact pads contacting the plurality of secure authentication ICs, the plurality of sub-contact pads including,
a first sub-contact pad configured to output a host power voltage,
a plurality of second sub-contact pads configured to output a host reset signal,
a third sub-contact pad configured to output a host clock signal, and
a fourth sub-contact pad configured to interface with the plurality of secure authentication ICs.

7. The smart card of claim 6, wherein each of the plurality of secure authentication ICs comprises:
a plurality of contact pads; and wherein
first, third, and fourth ones of the plurality of contact pads are connected to the first, third, and fourth sub-contact pads, respectively,
a second of the plurality of contact pads is connected to a corresponding second sub-contact pad among the plurality of second sub-contact pads, and
a fifth of the plurality of contact pads is grounded.

* * * * *